United States Patent
Bing (10) Patent No.: US 12,395,063 B1
(45) Date of Patent: Aug. 19, 2025

(54) CONTROL SYSTEM FOR A BI-DIRECTIONAL TOTEM-POLE AC-DC CONVERTER

(71) Applicant: Zhonghui Bing, Rochester Hills, MI (US)

(72) Inventor: Zhonghui Bing, Rochester Hills, MI (US)

( * ) Notice: Subject to any disclaimer, the term of this patent is extended or adjusted under 35 U.S.C. 154(b) by 229 days.

(21) Appl. No.: 18/234,909

(22) Filed: Aug. 17, 2023

Related U.S. Application Data (60) Provisional application No. 63/399,208, filed on Aug. 18, 2022.

(51) Int. Cl.
  *H02M 1/088* (2006.01)
  *H02M 1/00* (2006.01)
  *H02M 7/797* (2006.01)

(52) U.S. Cl.
  CPC ......... *H02M 1/088* (2013.01); *H02M 1/0009* (2021.05); *H02M 7/797* (2013.01)

(58) Field of Classification Search
  CPC ........... H02M 7/797; H02M 7/81; H02M 7/79
  See application file for complete search history.

(56) References Cited

U.S. PATENT DOCUMENTS

| | | | | |
|---|---|---|---|---|
| 2002/0145897 | A1* | 10/2002 | Hanaoka | H02M 1/0085 363/84 |
| 2020/0169187 | A1* | 5/2020 | Kobayashi | H02M 1/4233 |
| 2023/0027927 | A1* | 1/2023 | Imada | H02M 1/0009 |

\* cited by examiner

*Primary Examiner* — Nguyen Tran
(74) *Attorney, Agent, or Firm* — CANTOR COLBURN LLP (57) ABSTRACT

A control system for an AC-DC converter includes a mixed-signal power controller and first and second gate drivers. The controller has a digital module and an analog module. The analog module has a current sensor generating a current sense voltage based on a sensed switch current. The digital module has a DC voltage sensor generating a DC sense voltage based on a DC bus voltage, and an AC voltage sensor generating an AC sense voltage and a binary polarity signal based on the AC voltage. The digital module induces the first gate driver to output first and second control signals for controlling a high-side switch and a low-side switch of a current shaping half-bridge based on first and second clock signals and the comparator voltage, such that an inductor current flowing through an inductor is proportional to a current command value.

10 Claims, 9 Drawing Sheets

CONTROL SYSTEM FOR A BI-DIRECTIONAL TOTEM-POLE AC-DC CONVERTER

CROSS-REFERENCE TO RELATED APPLICATION

This application claims priority to U.S. Provisional Patent Application No. 63/399,208 filed on Aug. 18, 2022, the entire contents of which are hereby incorporated by reference herein.

BACKGROUND

AC-DC converters like Power Factor Correction (PFC) converters transfer energy from an AC side to a DC side only for DC load consumption or battery charging. An AC-DC bi-directional converter converts electric energy either from an AC side to a DC side thereof or vice versa depending on operational commands. Such bi-directional AC-DC converters are becoming a subject of business interest as the automotive industry introduces the Vehicle-to-grid (V2G) concept. V2G also known as vehicle-to-home (V2H) or vehicle-to-load (V2L) describes a system in which electric vehicles (EV), such as battery electric vehicles (BEV), or plug-in hybrid vehicles (PHEV) communicate with the power grid to intelligently schedule charging of a vehicle battery, or sell demand response services by either returning electricity to the grid or by throttling their charging rate. V2G storage capabilities can enable EVs to store and discharge electricity generated from renewable energy sources such as solar and wind, with output that fluctuates depending on weather and time of day. As a result, use of EVs for mobile energy storage can aid in reaching carbon emission targets and sustainable power generation and distribution The commercially available analog-based AC-DC controllers are generally for unidirectional PFC converters only, and therefore don't support energy going from the DC side to the AC side. Further, the AC-DC controllers use an expensive current sensing component to directly read an inductor current flowing through an inductor.

The inventor herein has recognized a need for an improved control system for a bi-directional totem-pole AC-DC converter that minimizes and/or reduces the above-mentioned problems.

SUMMARY

A control system for a bi-directional totem-pole AC-DC converter in accordance with an exemplary embodiment is provided. The converter has a current shaping half-bridge, a line synchronizing half-bridge, and an inductor. The current shaping half-bridge has a high-side switch and a low-side switch that are coupled in series between first and second nodes. The line synchronizing half-bridge has a high-side switch and a low-side switch that are coupled in series between the first and second nodes. The inductor is coupled to a third node between the high-side switch and the low-side switch of the current shaping half-bridge. The control system includes a first gate driver that is electrically coupled to the high-side switch and the low-side switch of the current shaping half-bridge. The control system further includes a second gate driver that is electrically coupled to the high-side switch and the low-side switch of the line synchronizing half-bridge. The control system further includes a mixed-signal power controller operably coupled to the first and second gate drivers. The mixed-signal power controller has a digital module and an analog module. The analog module has a current sensor that measures a sensed switch current from the low-side switch of the current shaping half-bridge and generating a current sense voltage based on the sensed switch current. The digital module has a DC voltage sensor that measures a DC bus voltage across the first and second nodes of the bi-directional totem-pole AC-DC converter and generates a DC sense voltage based on the DC bus voltage. The digital module has an AC voltage sensor that measures an AC voltage being applied to the bi-directional totem-pole AC-DC converter and generates an AC sense voltage and a binary polarity signal based on the AC voltage. The binary polarity signal indicates a polarity of the AC voltage. The AC sense voltage indicates a magnitude of the AC voltage. The digital module receives a power command value and a filtering command value from an external controller. The digital module determines a feedforward duty cycle value based on the AC sense voltage, the DC sense voltage, and the binary polarity signal. The digital module generates first and second clock signals based on the feedforward duty cycle value. The digital module determines a current command value based on the power command value and the filtering command value. The digital module determines a reference current value associated with the inductor based on the current command value. The analog module generates a comparator voltage based on a current sensor voltage and a compensation voltage. The compensation voltage is determined based on the reference current value. The digital module induces the first gate driver to output first and second control signals for controlling the high-side switch and the low-side switch respectively of the current shaping half-bridge based on the first and second clock signals and the comparator voltage, such that an average value of an inductor current flowing through the inductor is proportional to the current command value, and the bi-directional totem-pole AC-DC converter outputs a power level corresponding to the power command value.

BRIEF DESCRIPTION OF THE DRAWINGS

FIG. 4 is a schematic of the bi-directional totem-pole AC-DC converter having a high-side switch in a line synchronizing half-bridge turned off and a low-side switch in a line synchronizing half-bridge that is turned on;

FIG. 6 is a schematic of the bi-directional totem-pole AC-DC converter having a low-side switch in a line synchronizing half-bridge turned off and a high-side switch in a line synchronizing half-bridge that is turned on;

DETAILED DESCRIPTION

Figure 1A:
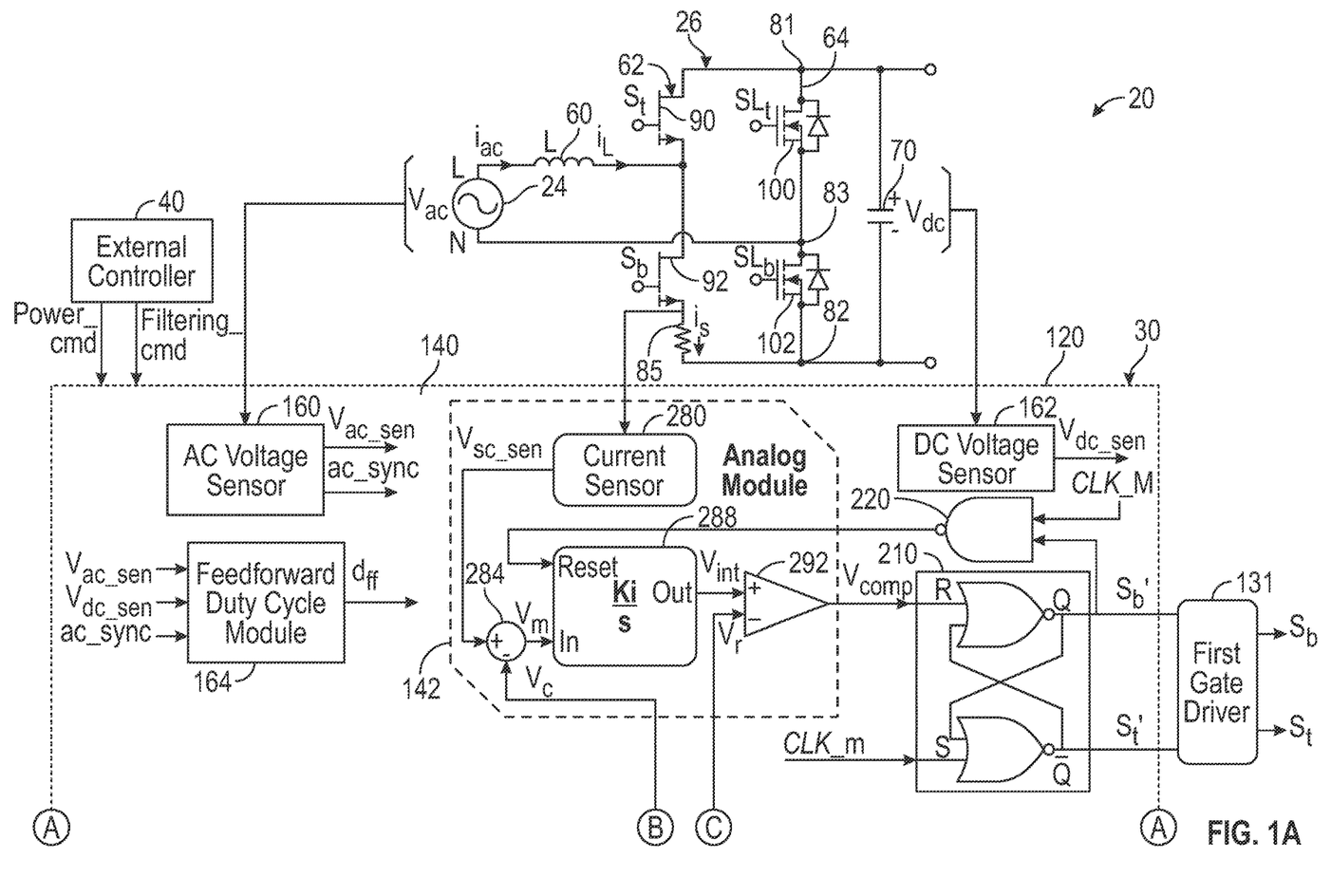
FIG. 1A is a block diagram of portion of a power system having an AC voltage source, a bi-directional totem-pole AC-DC converter, a control system in accordance with an exemplary embodiment, and an external controller.
Figure 1B:
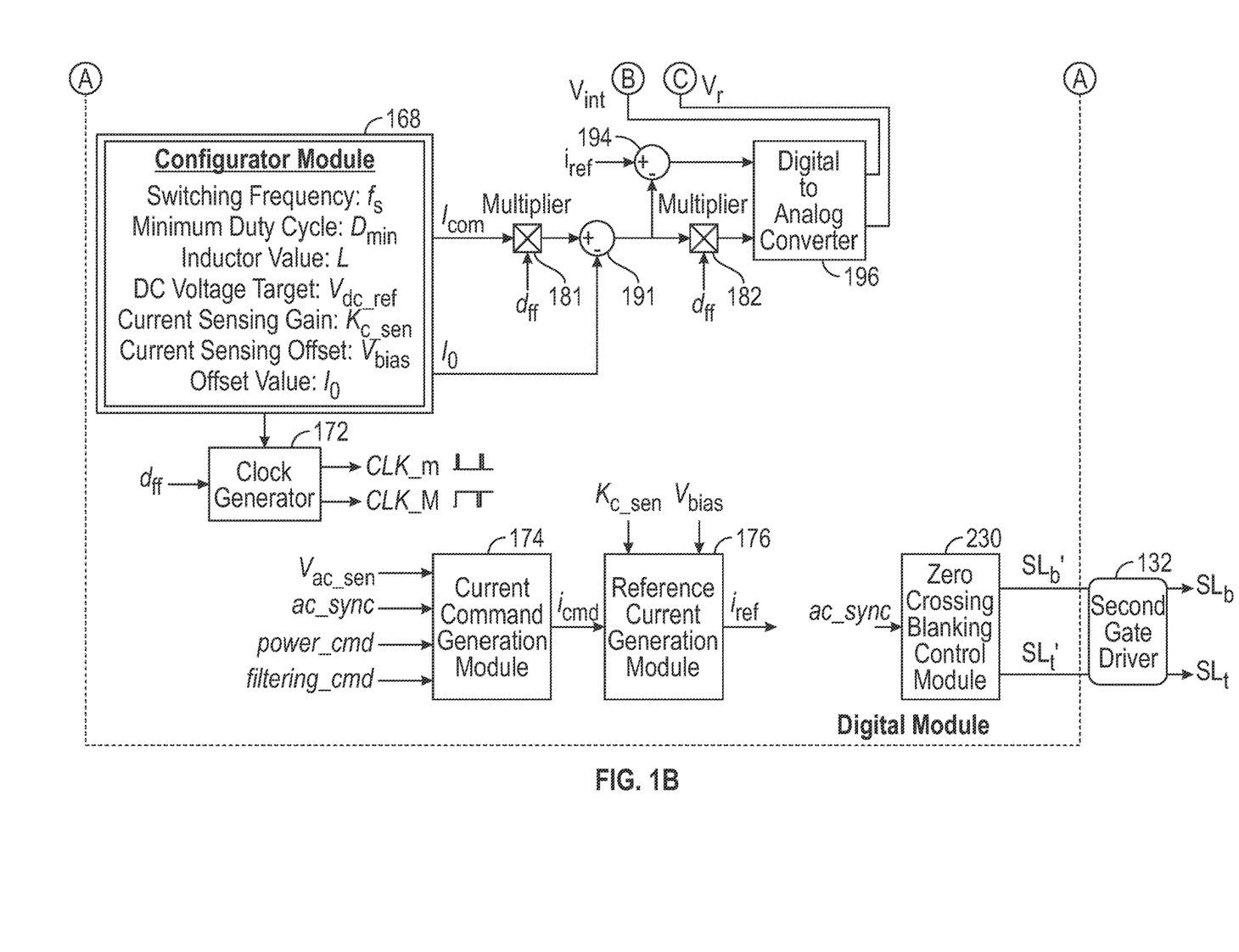
FIG. 1B is a block diagram of another portion of the power system of FIG. 1A.

Referring to FIGS. 1A and 1B, a power system 20 having an AC voltage source 24, a bi-directional totem-pole AC-DC converter 26, a control system 30 in accordance with an exemplary embodiment, and an external controller 40 is provided.

The term "substantially equal to" means+−5% from a value. For example a value substantially equal to 100 is a value within a range of 95-105.

Figure 2:
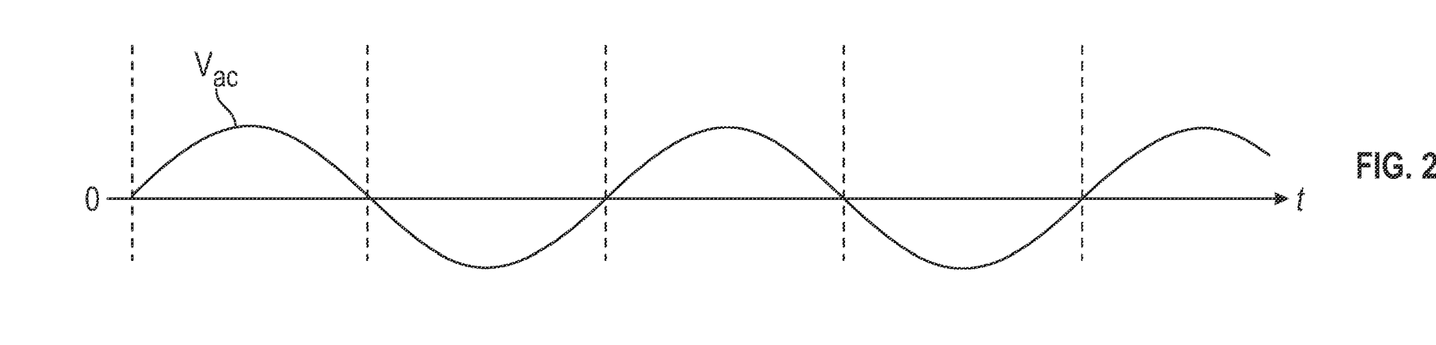
FIG. 2 is a schematic of an AC voltage from AC power source that is applied to the bi-directional totem-pole AC-DC converter.

The AC voltage source 24 is provided to supply an AC voltage ($v_{ac}$), shown in FIG. 2, to the bi-directional totem-pole AC-DC converter 26. The AC voltage source 24 is electrically coupled to a first end of an inductor 60 and a third node 83 of the bi-directional totem-pole AC-DC converter 26.

The bi-directional totem-pole AC-DC converter 26 converts power between a DC load/source 70 (e.g., a DC side of the converter 26) and the AC voltage source/load 24 (e.g., an AC side of the converter 26) depending on the power flow direction. The converter 26 has an inductor 60, a current shaping half-bridge 62, a line synchronizing half-bridge 64, a DC load/source 70, a first node 81, a second node 82, and a third node 83.

The current shaping half-bridge 62 has a high-side switch 90 and a low-side switch 92 that are electrically coupled in series between first and second nodes 81, 82. In an exemplary embodiment, the high-side switch 90 and the low-side switch 92 are each a gallium nitride (GaN) transistor or a silicon carbide (SiC) transistor. Further, the high-side switch 90 and the low-side switch 92 are electrically coupled to a first gate driver 131 of the control system 30 and are controlled by control signals St, Sb respectively therefrom.

The line synchronizing half-bridge 64 has a high-side switch 100 and a low-side switch 102 that are coupled in series between the first and second nodes 81, 82. In an exemplary embodiment, the high-side switch 100 and the low-side switch 102 are each a silicon (Si) MOSFET. Further, the high-side switch 100 and the low-side switch 102 are electrically coupled to a second gate driver 132 of the control system 30 and are controlled by control signals $SL_t$, $SL_b$ respectively therefrom. The inductor 60 is coupled to the third node 83 between the high-side switch 90 and the low-side switch 92 of the current shaping half-bridge 62, and to the AC voltage source 24.

The control system 30 includes a mixed-signal power controller 120, a first gate driver 131, and a second gate driver 132. The first and second gate drivers 131 132 are electrically coupled to the mixed-signal power controller 120. The first gate driver 131 receives a control signal $S_b'$ from the controller 120 and outputs a control signal $S_b$ in response to the signal $S_b'$. Further, the first gate driver 131 receives a control signal $S_t'$ from the controller 120 and outputs a control signal $S_t$ in response to the signal $S_t'$.

An advantage of the control system 30 is that the system 30 requires no high-performance ADCs, no special sampling, no complicated loop compensation calculation or parameter selection in order to achieve a desired control performance. Further, the control system measures a sensed switch current in a low-side switch 92 in a current shaping half-bridge 62 for feedback control of the converter 30 instead of utilizing an expensive sensor to directly monitor an inductor current flowing through an inductor for feedback control of the converter 30.

Before explaining the mixed-signal power controller 120, a brief explanation of how the control system 30 controls portions of the bi-directional totem-pole AC-DC converter 26 according to the polarity of the AC voltage ($v_{ac}$) will now be provided.

Figure 3:
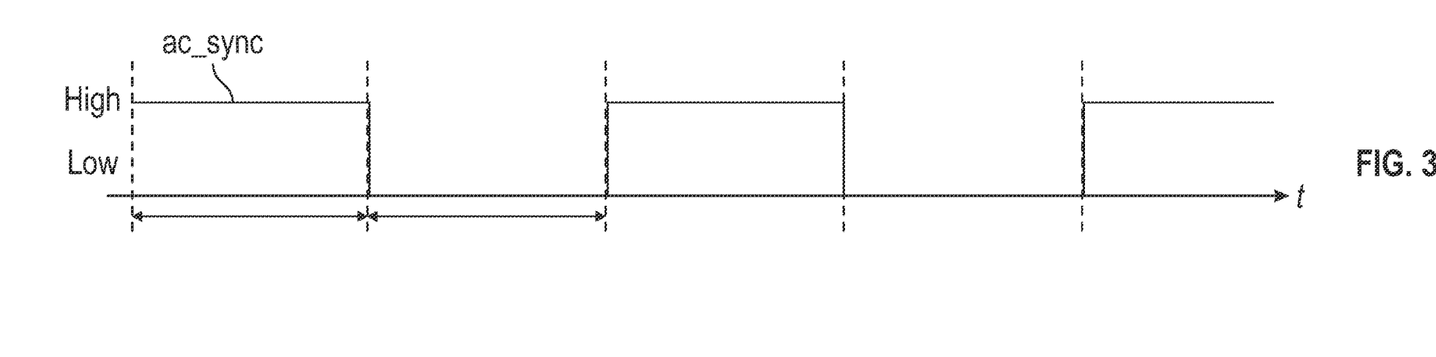
FIG. 3 is a schematic of a binary polarity signal (ac-sync) utilized in the control system of FIGS. 1A and 1B.
Figure 4:
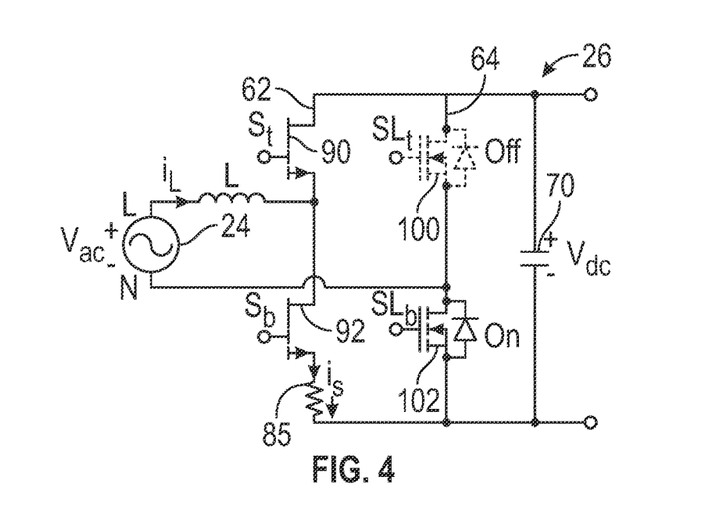
Figure 5:
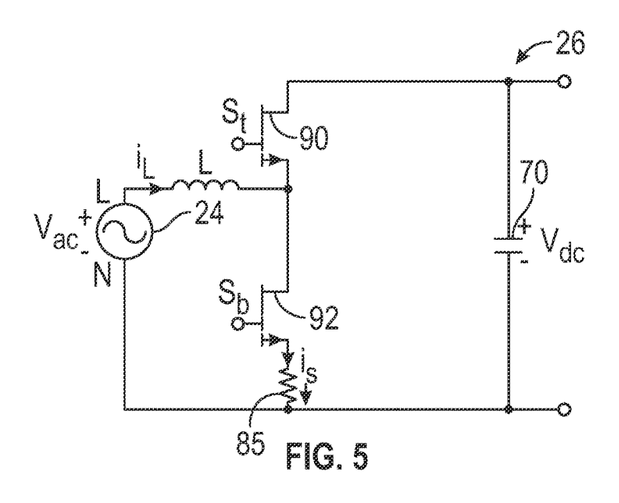
FIG. 5 is a schematic of an equivalent circuit of the bi-directional totem-pole AC-DC converter of FIG. 4.
Figure 6:
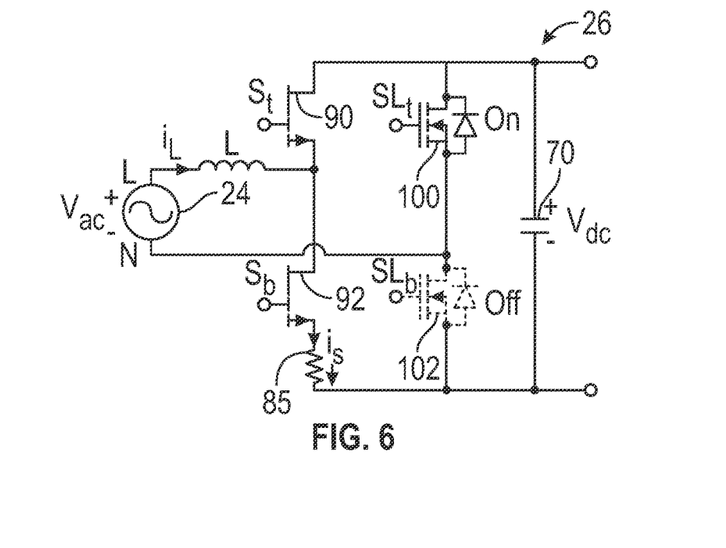
Figure 7:
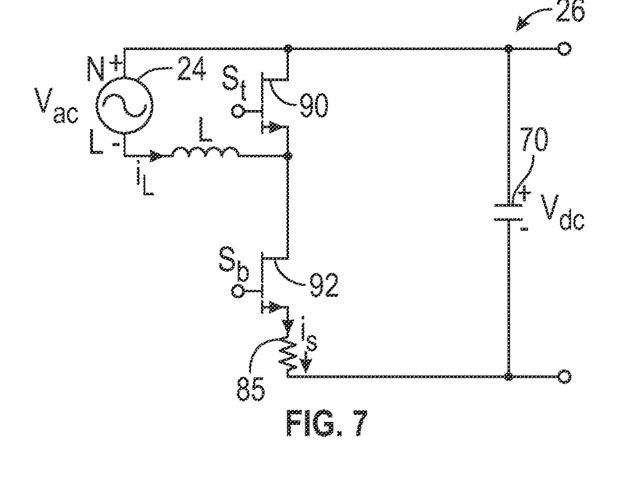
FIG. 7 is a schematic of an equivalent circuit of the bi-directional totem-pole AC-DC converter of FIG. 6.

Referring to FIGS. 1A, 1B and 2-4, when the AC voltage ($v_{ac}$) has a positive polarity such that the binary polarity signal (ac_sync) has a high logic value (e.g., binary 1), the control system 30 outputs the control signal $SL_b$ at a high logic level to turn on the low-side switch 102, and outputs the control signal $SL_t$ at a low logic level to turn off the high-side switch 100 of the line synchronizing half-bridge 64 for the half line cycle as shown in FIG. 3. As a result, referring to FIG. 5, the bi-directional totem-pole AC-DC converter 26 can be redrawn as an equivalent circuit in which the switch on-resistance of the low side switch 102 is ignored. In this case, the control system 30 will actively control the state of the low-side switch 92 of the current shaping half-bridge 62 at a high switching frequency $f_s$ (typically in a range from 50 kHz to 500 kHz) and reads the sensed switch current ($i_s$) for feedback control. The high-side switch 90 is operated complementary of the low-side switch 92 to conduct current. In other words, when the high-side switch 90 is turned on, the low-side switch 92 is turned off, and vice versa. The circuit shown in FIG. 5 operates as a boost converter.

Alternately, referring to FIGS. 1A, 1B, 2, 3, 6 and 7, when the AC voltage ($v_{ac}$) has a negative polarity such that the binary polarity signal (ac_sync) has a high logic value (e.g., binary 1), the control system 30 outputs the control signal $SL_b$ at a low logic level to turn off the low-side switch 102, and outputs the control signal $SL_t$ at a high logic level to turn on the high-side switch 100 of the line synchronizing half-bridge 64 for the half line cycle as shown in FIG. 3. As a result, referring to FIG. 7, the bi-directional totem-pole AC-DC converter 26 can be redrawn as an equivalent circuit when the switch on-resistance of the high-side switch 100 is ignored. In this case, the control system 30 will actively control the state of the low-side switch 92 of the current shaping half-bridge 62 at a high switching frequency $f_s$ and reads the sensed switch current ($i_s$) for feedback control. The high-side switch 90 is operated complementary of the low-side switch 92 to conduct current. In other words, when the high-side switch 90 is turned on, the low-side switch 92 is turned off, and vice versa. The circuit shown in FIG. 7 operates as a buck converter.

Referring to FIGS. 1A and 1B, the mixed-signal power controller 120 includes a digital module 140 and an analog module 142. The digital module 140 performs calculations to determine desired values and generates digital signals to perform the desired functionality described herein. The analog module 142 receives analog signals and generates analog signals to perform the desired functionality described herein.

The digital module includes an AC voltage sensor 160, a DC voltage sensor 162, a feedforward duty cycle module 164, a configurator module 168, a clock generator 172, a current command generation module 174, a reference current generation module 176, a first multiplier module 181, a second multiplier module 182, a summing module 191, a subtraction module 194, a digital-to-analog converter 196, an SR latch 210, a NAND logic gate 220, and a zero crossing blanking control module 230.

Referring to FIGS. 1A, 1B, 2, and 3, the AC voltage sensor 160 measures an AC voltage ($v_{ac}$) being applied to the bi-directional totem-pole AC-DC converter 26 by the AC voltage source 24 and generates an AC sense voltage ($v_{ac\_sen}$) and a binary polarity signal (ac_sync) based on the AC voltage.

The AC voltage ($v_{ac}$) can be represented mathematically as:

$$v_{ac} = \sqrt{2} * V_{rms} * \sin(2\pi * f_{ac} * t),$$

where $V_{rms}$ is the voltage rms value, which is typically 120V in the U.S. and 230V in China and Europe). $f_{ac}$ is the AC line frequency, which is 60 Hz in U.S. and 50 Hz in China and Europe. The AC sense voltage ($v_{ac\_sen}$) indicates a magnitude of the AC voltage.

The binary polarity signal (ac_sync) indicates a polarity of the AC voltage. The binary polarity signal (ac_sync) is defined as:

$$\text{ac\_sync} = \begin{cases} \text{HIGH} & \text{when } v_{ac} \text{ is positive} \\ \text{LOW} & \text{when } v_{ac} \text{ is negative} \end{cases}$$

The term "HIGH" refers to a high logic value (e.g., binary 1), and the term "LOW" refers to a low logic value (e.g., binary 0).

The DC voltage sensor 162 measures a DC bus voltage ($v_{dc}$) across the first and second nodes 81, 82, (which is across the capacitive load 70) of the bi-directional totem-pole AC-DC converter 26 and generates a DC sense voltage ($v_{dc\_sen}$) based on the DC bus voltage ($v_{dc}$).

The feedforward duty cycle module 164 determines a feedforward duty cycle value ($d_{ff}$) based on the AC sense voltage ($v_{ac\_sen}$), the DC sense voltage ($v_{dc\_sen}$), and the binary polarity signal (ac_sync). The feedforward duty cycle value ($d_{ff}$) is determined using the following equation:

$$d_{ff} = \begin{cases} 1 - \dfrac{v_{ac\_sen}}{v_{dc\_sen}} & \text{when } v_{ac} \text{ is positive} \\ \dfrac{v_{ac\_sen}}{v_{dc\_sen}} & \text{when } v_{ac} \text{ is negative} \end{cases}$$

The configurator module 168 stores constant values that are set by a user and are utilized by the mixed-signal power controller 120 for controlling the bi-directional totem-pole AC-DC converter 26 in a desired manner. In particular, the configurator module 168 stores a switching frequency value ($f_s$), a minimum duty cycle value ($D_{min}$), an inductor value (L), a DC voltage target value ($V_{dc\_ref}$), a current sensing gain ($K_{c\_sen}$), a current sensing offset ($V_{bias}$), and offset value ($I_o$). The configurator module 168 sends the foregoing values to the clock generator 172. The switching frequency value ($f_s$) is selected based on system optimization of efficiency, power density, and electromagnetic compatibility.

The minimum duty cycle value ($D_{min}$) is utilized to ensure complete switching of the low-side switch 92 by the control signal $S_b$. The inductor value (L) corresponds to the inductance of the inductor 60. The DC voltage target value ($V_{dc\_ref}$) corresponds to either a desired DC output voltage or DC voltage level regulated by another power converter. The current sensing gain ($K_{c\_sen}$) corresponds to the total amplification gain from the switch current ($i_s$) to controller internal sensed analog value ($v_{sc\_sen}$). The offset value ($I_o$) is a relatively small offset value (typically <5% of $I_{com}$) to address a converter zero-crossing distortion issue due to very sensitive controls for small current and shall be tuned in the application.

The configurator module 168 determines the current compensation value ($I_{com}$) to ensure the stability of the current control. The current compensation value ($I_{com}$) is determined using the following equation:

$$I_{com} = K_{c\_sen} * \left(\dfrac{d_{ff\_max}}{1 - d_{ff\_max}}\right)\left(\dfrac{V_{dc\_ref}}{4L * f_s} * \dfrac{1}{2}\right) \text{ where } d_{ff\_max} = \dfrac{320V}{V_{dc\_ref}}$$

The clock generator 172 operably communicates with the configurator module 168. The clock generator 172 generates the first and second synchronous leading-edge clock signals (CLK_m, CLK_M) to control operation of the SR latch 210, the NAND logic gate 220, and the analog module 142. The clock generator 172 generates the first and second clock signals (CLK_m, CLK_M) based on the feedforward duty cycle value ($d_{ff}$), the switching frequency value ($f_s$), the minimum duty cycle value ($D_{min}$), the inductor value (L), the DC voltage target value ($V_{dc\_ref}$), the current sensing gain value ($K_{c\_sen}$), the current sensing offset value ($V_{bias}$), and the offset value ($I_o$). The first clock signal (CLK_m) is received at the S terminal of the SR latch 210. The second clock signal (CLK_M) is received as an input to the NAND logic gate 220.

The first clock signal (CLK_m) represents a clock signal with a ON state with the minimum duty cycle ($D_{min}$), and the second clock signal (CLK_M) represents a clock signal with a ON state with a duty cycle of ($1-D_{min}$). The first and second clock signals (CLK_m, CLK_M) both have the same frequency $f_s$ and synchronize the leading edge (meaning both changing logic from LOW to HIGH at the beginning of each period). The first and second clock signals (CLK_m, CLK_M) are mathematically expressed as:

$$\text{CLK\_m} = \begin{cases} 1 & kT_s \leq t < (k + D_{min})T_s \\ 0 & (k + D_{min})T_s \leq t < (k+1)T_s \end{cases}$$

$$\text{CLK\_M} = \begin{cases} 1 & kT_s \leq t < (k + 1 - D_{min})T_s \\ 0 & (k + 1 - D_{min})T_s \leq t < (k+1)T_s \end{cases}$$

where $T_s$ is the period of a switching cycle of the low-side switch 92 and therefore equals to $1/f_s$. k represents the kth switching period. When feedforward duty cycle value ($d_{ff}$) is less than the minimum duty cycle ($D_{min}$), both clock signals CLK_m and CLK_M remain LOW (e.g., binary 0) for the complete switching cycle instead.

The current command generation module 174 determines the current command value ($i_{cmd}$) based on the AC sense voltage ($v_{ac\_sen}$), the binary polarity signal (ac_sync), the power command value (power_cmd), and the filtering command value (filtering_cmd). The power command value (power_cmd) and the filtering command value (filtering_cmd) are received from the external controller 40. The power command value (power_cmd) represents the active power flow desired through the bi-directional totem-pole AC-DC converter 26, which can be positive to represent energy flowing from the AC side to the DC side of the converter 26 and negative to represent energy flowing from the DC side to the AC side. The filtering command value (filtering_cmd) represents the desired reactive current and harmonic currents that the control system 30 wants the AC current to contain for active power filtering. The filtering command value (filtering_cmd) can be mathematically represented as:

$$\text{filtering\_cmd} = I_1 * \sin\left(2\pi * f_{ac} * t + \frac{\pi}{2}\right) + \sum_{k=2} I_k * \sin(2\pi * k * f_{ac} * t + \varphi_k)$$

where $I_1$ and $I_k$ are each current frequency component amplitude, $\varphi_k$ is the corresponding phase angle. The range of k is application dependent and can go up to 39 for example.

In particular, the power command value (power_cmd) and the filtering command value (filtering_cmd) are used to determine the amplitude, phase shift and harmonic content of the current command value ($i_{cmd}$). The power command value (power_cmd) is determined using the following equation:

$$i_{cmd} = \frac{\sqrt{2} * \text{power\_cmd}}{V_{rms}} * \sin(2\pi * f_{ac} * t) + \text{filtering\_cmd}$$

The binary polarity signal (ac_sync) is used as the phase shift reference signal. The current command value ($i_{cmd}$) is the current command that is generated from the active power desired to be transferred between the AC side and the DC side of the bi-directional totem-pole AC-DC converter 26 in conjunction with active power filtering.

Also, three typical use cases include:

Case 1: rectification with power factor correction when the current command value ($i_{cmd}$) is in phase with the binary polarity signal (ac_sync) (and with the AC voltage ($v_{ac}$)) and is a pure sinusoidal signal. In this case, the power transfers from the AC side to the DC side of the converter 26.

Case 2: regeneration with unity power factor when the current command value ($i_{cmd}$) is 180° out of phase with the binary polarity signal (ac_sync) (and with the AC voltage ($v_{ac}$)) and is a pure sinusoidal signal. In this case, the power transfers from the DC side to the AC side of the converter 26.

Case 3: active power filtering when the current command value ($i_{cmd}$) is at a given phase with binary polarity signal (ac_sync) (and with the AC voltage ($v_{ac}$)) and contains a desired number of harmonic contents. In this case, the power can transfer in either direction dependent on the configuration of the control system 30.

The current command generation module 174 sends the current command value ($i_{cmd}$) to the reference current generation module 176.

The reference current generation module 176 determines the reference current value ($i_{ref}$) based on the current command value ($i_{cmd}$), the current sensing gain value ($K_{c\_sen}$), and the current sensing offset value ($V_{bias}$). In particular, the reference current value ($i_{ref}$) is determined using the following equation:

$$i_{ref} = K_{c\_sen} * i_{cmd} + V_{bias}$$

The reference current generation module 176 sends the reference current value ($i_{ref}$) to the subtraction module 194.

Figure 8:
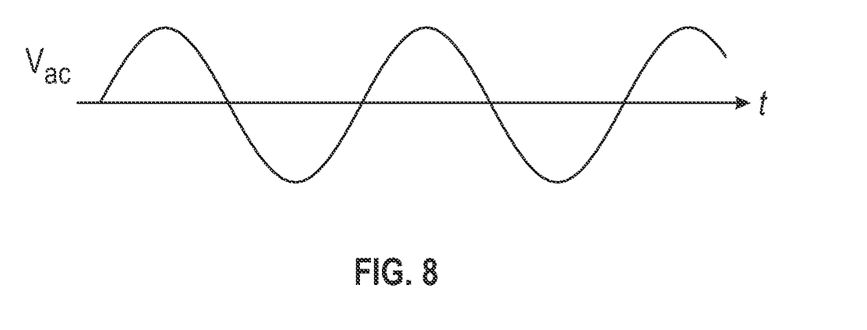
FIG. 8 is a schematic of an AC voltage ($v_{ac}$) that is applied to the bi-directional totem-pole AC-DC converter.
Figure 9:
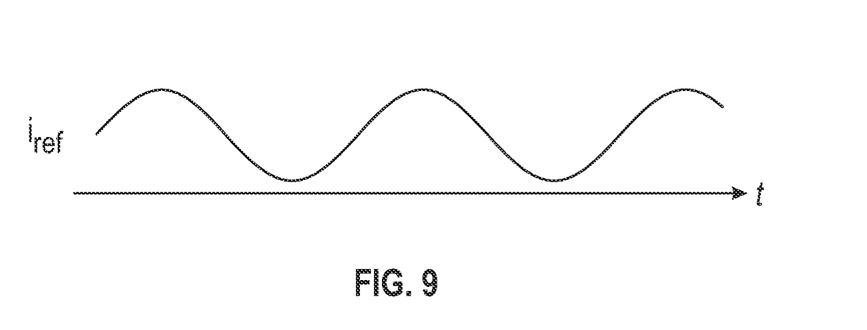
FIG. 9 is a schematic of a reference current value ($i_{ref}$) over time that is generated by the control system when rectification with power factor correction is desired when a current command value ($i_{cmd}$) is in phase with a binary polarity signal (ac_sync) associated with the AC voltage ($v_{ac}$) of FIG. 8 such that power transfers from the AC side to the DC side of the bi-directional totem-pole AC-DC converter.
Figure 10:
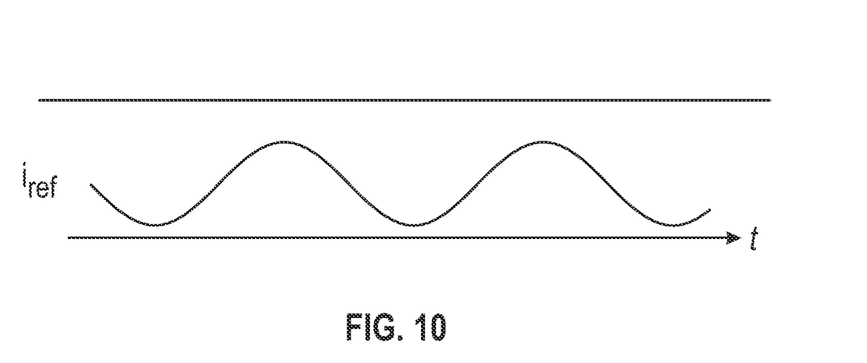
FIG. 10 is a schematic of a reference current value ($i_{ref}$) over time that is generated by the control system when regeneration with unity power factor is desired when the current command value ($i_{cmd}$) is 1800 out of phase with the binary polarity signal (ac_sync) associated with the AC voltage ($v_{ac}$) of FIG. 8 such that power transfers from the DC side to the AC side of the bi-directional totem-pole AC-DC converter.
Figure 11:
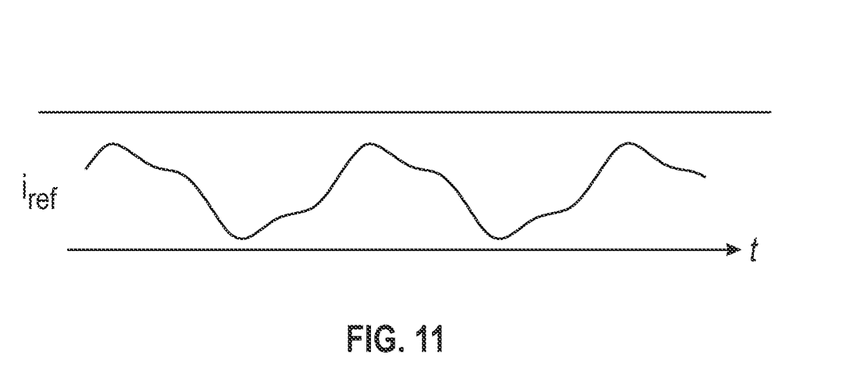
FIG. 11 is a schematic (T1-T2) of a reference current value ($i_{ref}$) over time that is generated by the control system when active power filtering is desired when the current command value ($i_{cmd}$) is at a given phase with binary polarity signal (ac_sync) associated with the AC voltage ($v_{ac}$) of FIG. 8 and contains a desired number of harmonic contents such that power may transfer in either direction dependent on the configuration of the control system.
Figure 12:
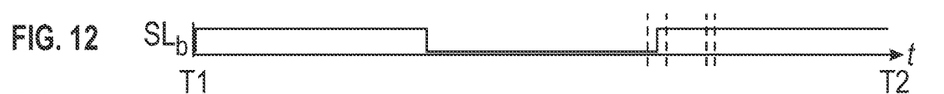
FIG. 12 is a schematic of a control signal generated by the control system over a first time period to control a low-side switch in a line synchronizing half-bridge in the bi-directional totem-pole AC-DC converter.
Figures 13, 14:
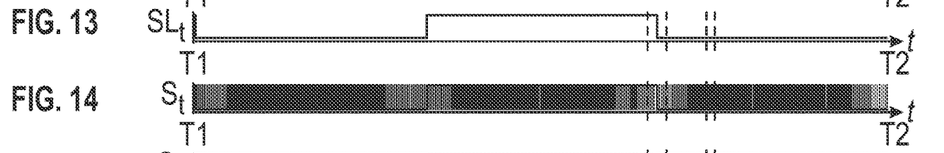
FIG. 13 is a schematic of a control signal generated by the control system over the first time period of FIG. 12 to control a high-side switch in a line synchronizing half-bridge in the bi-directional totem-pole AC-DC converter.
FIG. 14 is a schematic of a control signal generated by the control system over the first time period of FIG. 12 to control a high-side switch in the current shaping half-bridge in the bi-directional totem-pole AC-DC converter.
Figure 15:
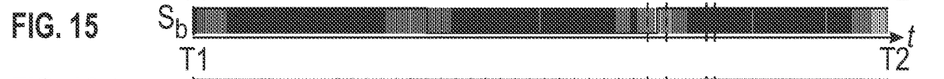
FIG. 15 is a schematic of a control signal generated by the control system over the first time period of FIG. 12 to control a low-side switch in the current shaping half-bridge in the bi-directional totem-pole AC-DC converter.
Figure 16:
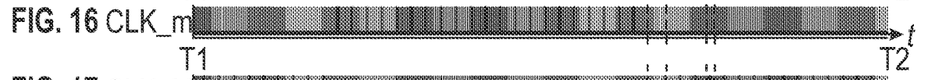
FIG. 16 is a schematic of a first clock signal (CLK_m) generated by a clock generator in the control system over the first time period of FIG. 12.
Figures 17, 18:
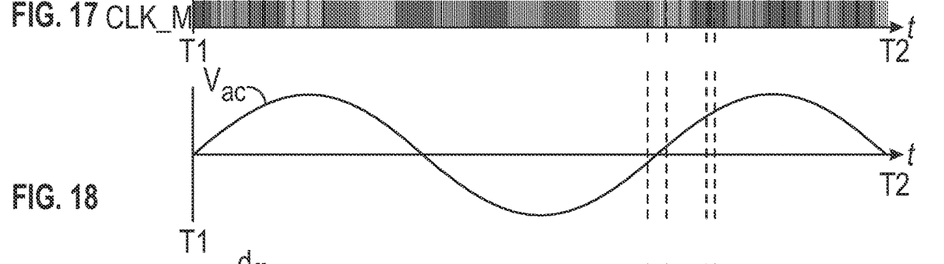
FIG. 17 is a schematic of a second clock signal (CLK_M) generated by a clock generator in the control system over the first time period of FIG. 12.
FIG. 18 is a schematic of an AC voltage ($v_{ac}$) generated by an AC voltage source over the first time period of FIG. 12 that is applied to the bi-directional totem-pole AC-DC converter.
Figure 19:
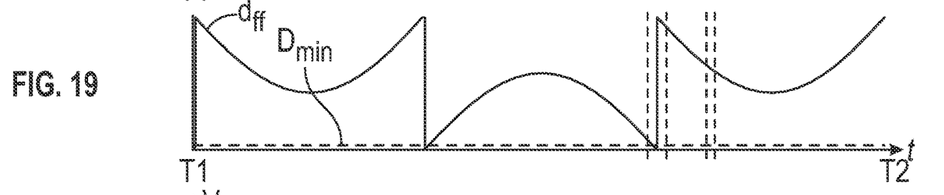
FIG. 19 is a schematic of a feedforward duty cycle value ($d_{ff}$) and a minimum duty cycle ($D_{min}$) over the first time period of FIG. 12 that is generated by the control system.
Figure 20:
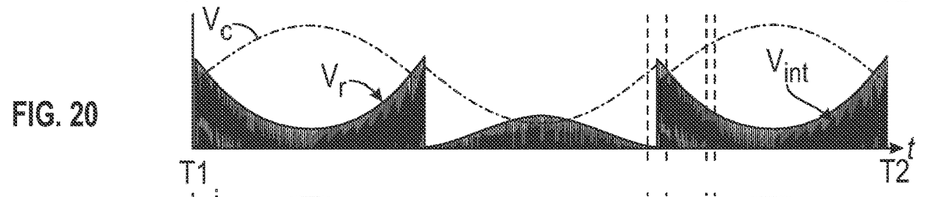
FIG. 20 is a schematic of a compensation voltage ($v_c$), an integrated voltage ($v_{int}$), and a reference voltage ($v_r$) over the first time period of FIG. 12 that is generated by the control system.
Figure 21:
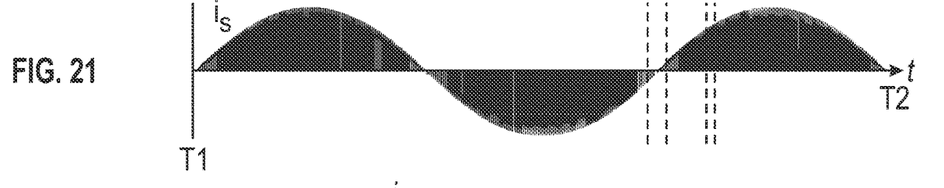
FIG. 21 is a schematic of a sensed switch current ($i_s$) flowing through a low-side switch of the current shaping half-bridge over the first time period of FIG. 12.
Figure 22:
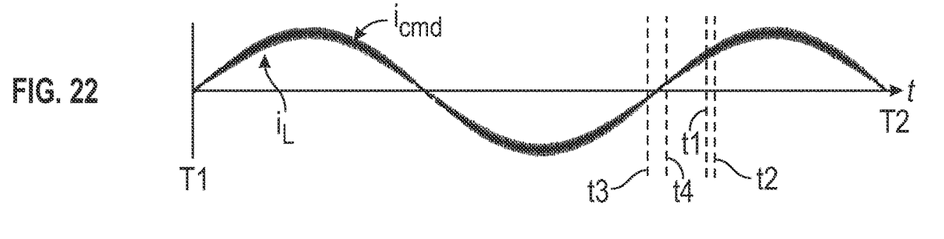
FIG. 22 is a schematic of an inductor current ($i_L$) flowing through the inductor of the bi-directional totem-pole AC-DC converter and a current command value ($i_{cmd}$) generated by the control system over the first time period of FIG. 12.
Figure 23:
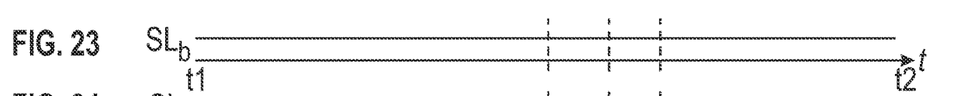
FIG. 23 is a schematic of a control signal generated by the control system over a first time interval (t1-t2) of the first time period (T1-T2) of FIG. 12 to control a low-side switch in a line synchronizing half-bridge in the bi-directional totem-pole AC-DC converter.
Figure 24:
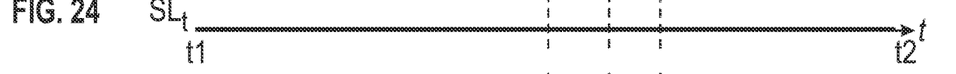
FIG. 24 is a schematic of a control signal generated by the control system over the first time interval of FIG. 23 to control a high-side switch in a line synchronizing half-bridge in the bi-directional totem-pole AC-DC converter.
Figure 25:
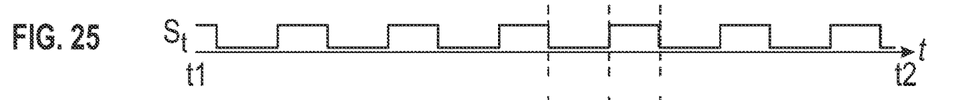
FIG. 25 is a schematic of a control signal generated by the control system over the first time interval of FIG. 23 to control a high-side switch in the current shaping half-bridge in the bi-directional totem-pole AC-DC converter.
Figure 26:
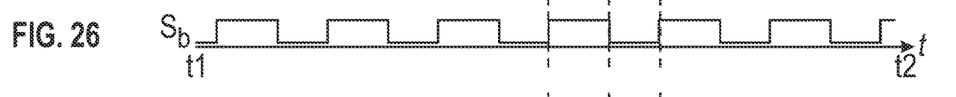
FIG. 26 is a schematic of a control signal generated by the control system over the first time interval of FIG. 23 to control a low-side switch in the current shaping half-bridge in the bi-directional totem-pole AC-DC converter.
Figure 27:
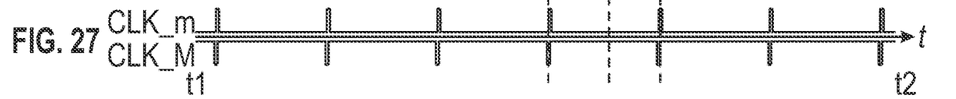
FIG. 27 is a schematic of a first clock signal (CLK_m) generated by a clock generator in the control system over the first time interval of FIG. 23.
Figure 28:
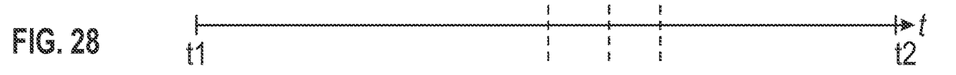
FIG. 28 is a schematic of a second clock signal (CLK_M) generated by a clock generator in the control system over the first time interval of FIG. 23.
Figure 29:
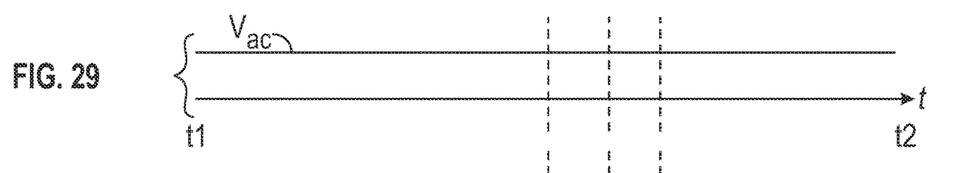
FIG. 29 is a schematic of an AC voltage ($v_{ac}$) generated by an AC voltage source over the first time interval of FIG. 23 that is applied to the bi-directional totem-pole AC-DC converter.
Figure 30:
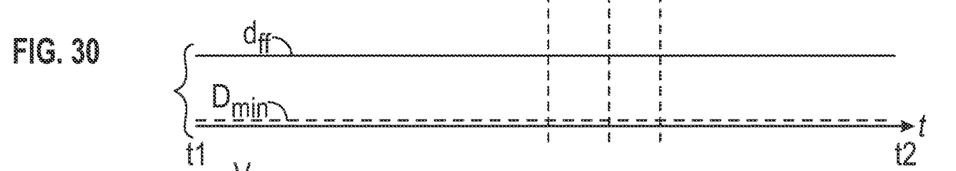
FIG. 30 is a schematic of a feedforward duty cycle value ($d_{ff}$) and a minimum duty cycle ($D_{min}$) over the first time interval of FIG. 23 that is generated by the control system.
Figure 31:
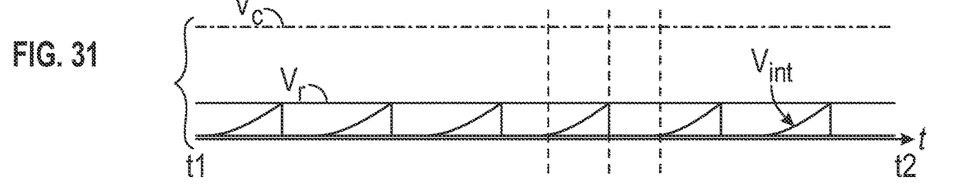
FIG. 31 is a schematic of a compensation voltage ($v_c$), an integrated voltage ($v_{int}$), and a reference voltage ($v_r$) over the first time interval of FIG. 23 that is generated by the control system.
Figure 32:
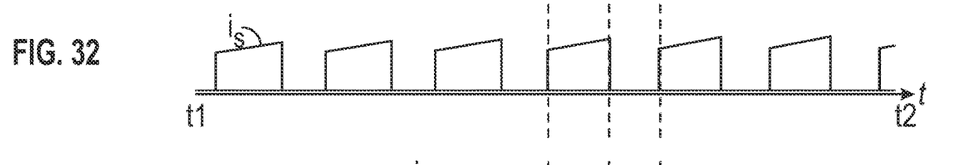
FIG. 32 is a schematic of a sensed switch current ($i_s$) flowing through a low-side switch of the current shaping half-bridge over the first time interval of FIG. 23.
Figure 33:
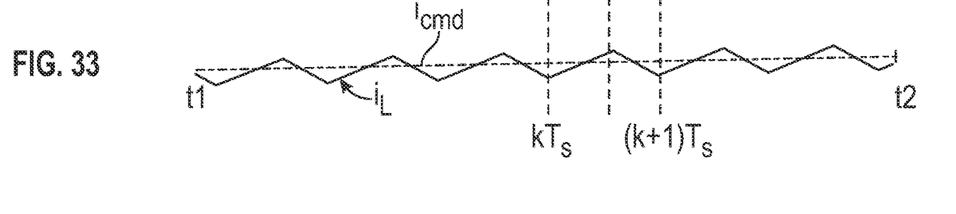
FIG. 33 is a schematic of an inductor current ($i_L$) flowing through the inductor of the bi-directional totem-pole AC-DC converter and a current command value ($i_{cmd}$) generated by the control system over the first time interval of FIG. 23.
Figure 34:
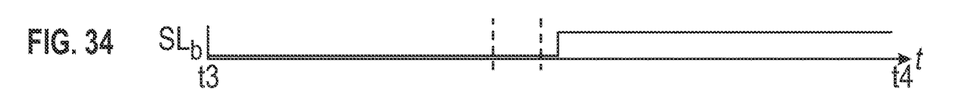
FIG. 34 is a schematic of a control signal generated by the control system over a second time interval (t3-t4) of the first time period (T1-T2) to control a low-side switch in a line synchronizing half-bridge in the bi-directional totem-pole AC-DC converter.
Figure 35:
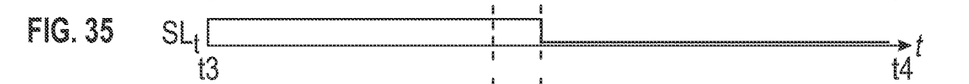
FIG. 35 is a schematic of a control signal generated by the control system over the second time interval of the first time period of FIG. 12 to control a high-side switch in a line synchronizing half-bridge in the bi-directional totem-pole AC-DC converter.
Figure 36:
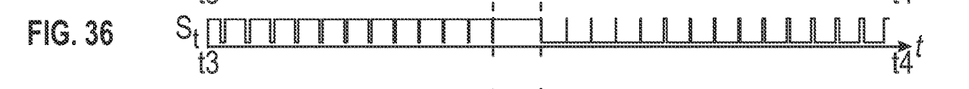
FIG. 36 is a schematic of a control signal generated by the control system over the second time interval of FIG. 35 to control a high-side switch in the current shaping half-bridge in the bi-directional totem-pole AC-DC converter.
Figure 37:
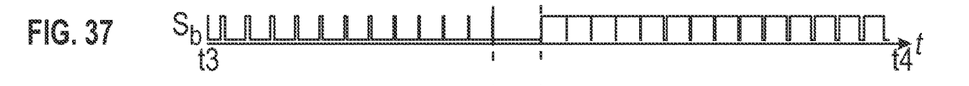
FIG. 37 is a schematic of a control signal generated by the control system over the second time interval of FIG. 35 to control a low-side switch in the current shaping half-bridge in the bi-directional totem-pole AC-DC converter.
Figure 38:
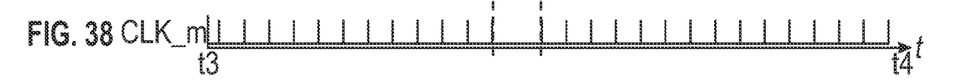
FIG. 38 is a schematic of a first clock signal (CLK_m) generated by a clock generator in the control system over the second time interval of FIG. 35.
Figure 39:
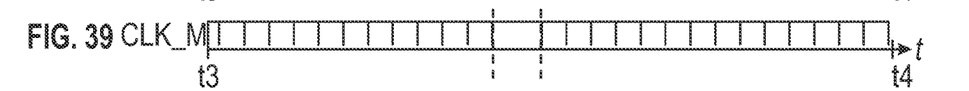
FIG. 39 is a schematic of a second clock signal (CLK_M) generated by a clock generator in the control system over the second time interval of FIG. 35.
Figure 40:
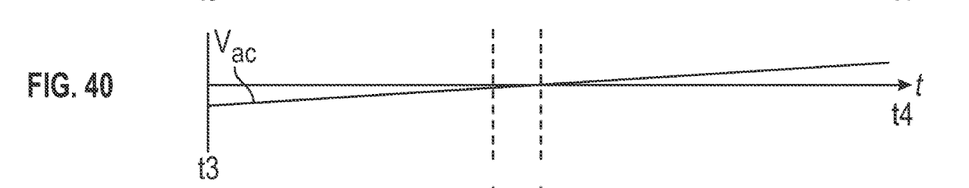
FIG. 40 is a schematic of an AC voltage ($v_{ac}$) generated by an AC voltage source over the second time interval of FIG. 35 that is applied to the bi-directional totem-pole AC-DC converter.
Figure 41:
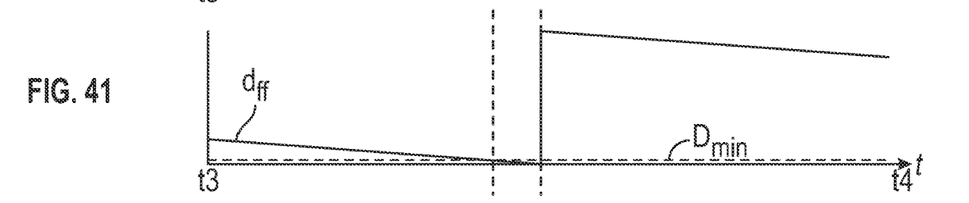
FIG. 41 is a schematic of a feedforward duty cycle value ($d_{ff}$) and a minimum duty cycle ($D_{min}$) over the second time interval of FIG. 35 that is generated by the control system.
Figure 42:
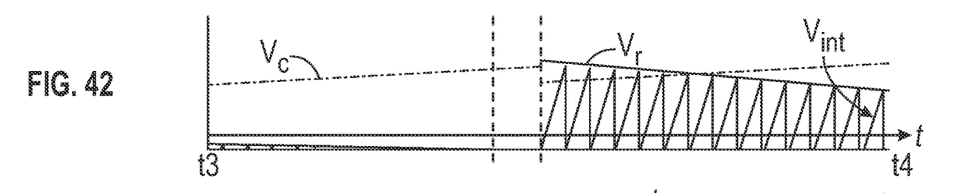
FIG. 42 is a schematic of a compensation voltage ($v_c$), an integrated voltage ($v_{int}$), and a reference voltage ($v_r$) over the second time interval of FIG. 35 that is generated by the control system.
Figure 43:
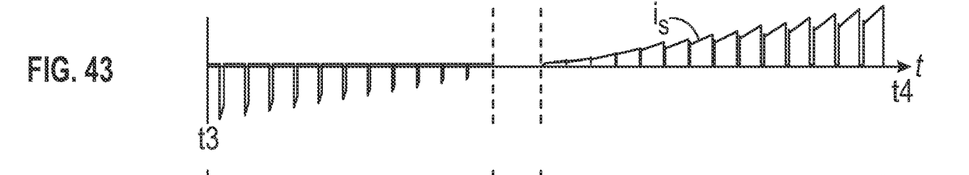
FIG. 43 is a schematic of a sensed switch current (Is) flowing through a low-side switch of the current shaping half-bridge over the second time interval of FIG. 35.
Figure 44:
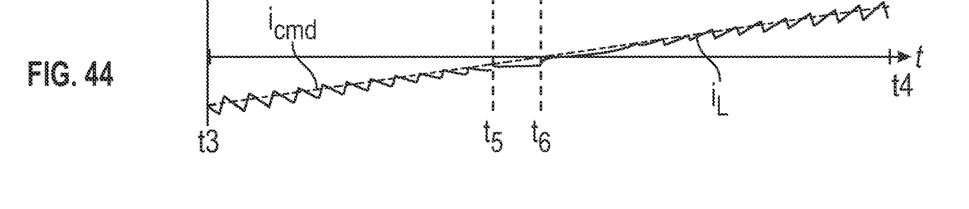
FIG. 44 is a schematic of an inductor current ($i_L$) flowing through the inductor of the bi-directional totem-pole AC-DC converter and a current command value ($i_{cmd}$) generated by the control system over the second time interval of FIG. 35.

Referring to FIGS. 8-11, the AC voltage ($v_{ac}$) and three examples of the current reference value ($i_{ref}$) are illustrated. FIG. 8 illustrates the reference current value ($i_{ref}$) over time. FIG. 9 illustrates the current reference signal ($i_{ref}$) over time for Case 1 of rectification with power factor correction. FIG. 10 illustrates the current reference value ($i_{ref}$) over time for Case 2 of regeneration with a unity power factor. And FIG. 11 illustrates the current reference value ($i_{ref}$) over time for Case 3 with active power filtering.

Referring to FIGS. 1A and 1B, the first multiplier module 181 multiplies the current compensation value ($I_{com}$) and the feedforward duty cycle value ($d_{ff}$) to obtain a first current value, and sends the first current value to the first summing module 191.

The summing module 191 sums the first current value from the first multiplier module 181 and the offset value ($I_o$) to obtain a second current value, and sends the second current value to both the subtraction module 194 and the second multiplier module 182.

The second multiplier module 182 multiplies the second current value from the summing module 191 and the feedforward duty cycle value ($d_{ff}$) to obtain a fourth current value, and sends the fourth current value to the digital-to-analog converter 196.

The subtraction module 194 subtracts the second current value from the summing module 191 from the reference current value ($i_{ref}$) to obtain a third current value, and sends the third current value to the digital-to-analog converter 196.

The digital-to-analog converter 196 receives the third current value from the subtraction module 194 and generates a compensation voltage ($v_c$) based on the third current value. The compensation voltage ($v_c$) is represented by the following equation:

$$v_c = i_{ref} - (I_{com} * d_{ff} + I_0)$$

The compensation voltage ($v_c$) is received by a subtraction module 284 in the analog module 142.

The digital-to-analog converter 196 receives the fourth current value from the second multiplier module 182 and generates a reference voltage ($v_r$) based on the fourth current value. The reference voltage ($v_r$) is represented by the following equation:

$$v_r = d_{ff} - (I_{com} * d_{ff} + I_0)$$

The reference voltage ($v_r$) is received at an inverting terminal of the comparator 292.

Before explaining the SR latch 210, the NAND logic gate 220, and the zero-crossing blanking control module 230, the analog module 142 will be explained. The analog module 142 includes a current sensor 280, a subtraction module 284, an integrator 288, and a comparator 292.

The current sensor 280 is electrically coupled to the low-side switch 92 of the current shaping half-bridge 62 and to the positive terminal of the subtraction module 284. In an exemplary embodiment, a resistor 85 with a relatively small resistance (e.g., less than 100 ohms) is electrically coupled in series with the switch 92 between the switch 92 and the node 82. The current sensor 280 measures a voltage across the resistor 85 to determine/measure the sensed switch current ($i_s$). The sensed switch current ($i_s$) is equal to the voltage across the resistor 85 divided by the resistance of the resistor. Thus, the current sensor 280 measures the sensed switch current ($i_s$) from the low-side switch 92 and generates a current sense voltage ($v_{sc\_sen}$) based on the sensed switch current ($i_s$). The current sense voltage ($v_{sc\_sen}$) is represented by the following equation:

The subtraction module 284 has a positive input terminal, a negative input terminal and an output terminal. The positive input terminal of the subtraction module 284 is electrically coupled to the current sensor 280. The negative input terminal of the subtraction module 284 is electrically coupled to the digital-to-analog converter 196. The output terminal of the subtraction module 284 is electrically coupled to the input terminal of the integrator 288. The subtraction module 284 subtracts the current sense voltage $v_{sc\_sen}$ at the positive terminal thereof from a compensation voltage ($v_c$) at the negative terminal thereof to obtain a difference voltage ($v_{in}$) at the output terminal thereof.

The integrator 288 is provided to integrate the difference voltage ($v_{in}$) over time and to output an integrated voltage ($v_{int}$). The integrator 288 has an input terminal, a reset terminal, and an output terminal. The input terminal of the integrator 288 is electrically coupled to the subtraction module 284 and receives the difference voltage ($v_{in}$). The reset terminal of the integrator 288 is electrically coupled to an output terminal of the NAND logic gate 220. The output terminal of the integrator 288 is operably coupled to the non-inverting terminal of the comparator 292, and outputs the integrated voltage ($v_{int}$). During operation, the integrator 288 integrates the difference voltage ($v_{in}$). at the input port thereof and continuously outputs the integrated voltage ($v_{int}$). The integrated voltage ($v_{int}$) is represented by the following equation:

$$v_{int} = f_s * \int_0^t [(K_{c\_sen} * i_s + V_{bias}) - (i_{ref} - I_{com} * d_{ff} - I_0)]$$

The integration continues until a high logic level (e.g., binary 1) is asserted at the reset terminal of the integrator 288. Then, the integrated voltage ($v_{int}$) is cleared to zero and remains zero as long as the reset terminal is receiving the high logic level (e.g., binary 1).

The analog comparator 292 is provided to compare the integrated voltage ($v_{int}$) to a reference voltage ($v_r$) and to output the comparator voltage ($v_{comp}$). The comparator 292 has a non-inverting terminal, an inverting terminal, and an output terminal. The non-inverting terminal of the comparator 292 is electrically coupled to the output terminal of the integrator 288 and receives the integrated voltage ($v_{int}$) therefrom. The inverting terminal of the comparator 292 is electrically coupled to an output terminal of the digital-to-analog converter 196 and receives the reference voltage ($v_r$) therefrom. The output terminal of the comparator 292 is electrically coupled to the R terminal of the SR latch 210 which receives the comparator voltage ($v_{comp}$).

During operation, the comparator 292 compares the integrated voltage ($v_{int}$) to the reference voltage ($v_r$). When ($v_{int}$) is less than ($v_r$), the comparator 292 output a low logic signal, and when ($v_{int}$) is greater than ($v_r$), the comparator 292 output a high logic level. The moment when the two signals ($v_{int}$) and ($v_r$) become equal to one another can be expressed by the following equation:

$$f_s * \int_0^{dT_s} [(K_{c\_sen} * i_s + V_{bias}) - (i_{ref} - I_{com} * d_{ff} - I_0)] = d_{ff} * (I_{com} * d_{ff} - I_0)$$

Referring again to the digital module 140, the SR latch 210, the NAND logic gate 220 and the zero crossing blanking control module 230 will be explained.

The SR latch 210 is provided to output control signals $S_b'$ and $S_t$, to induce the first gate driver 131 to output first and second control signals $S_b$ and $S_t$ respectively. The SR latch 210 has an R terminal, an S terminal, a Q terminal, and Q-bar terminal. The R terminal is electrically coupled to the output terminal of the comparator 292 and receives the comparator voltage ($v_{comp}$). The S terminal is electrically coupled to the clock generator 172 and receives the first clock signal (CLK_m). The Q terminal is electrically coupled to the first gate driver 131 and outputs the control signal $S_b'$ which is received by first gate driver 131. The Q-bar terminal is electrically coupled to the first gate driver 131 and outputs the control signal $S_t'$ which is received by first gate driver 131.

When ($v_{int}$) transitions to be greater than ($v_r$), the comparator 292 outputs the comparator voltage ($v_{comp}$) as a high logic signal (e.g., transitions from a low logic level to a high logic level) which is input to the R terminal of the SR latch 210—to reset and latch the SR latch 210 such that the Q terminal outputs a low logic level (e.g., 0). When the SR latch 210 has the Q terminal latched at a low logic signal (e.g., 0), the output of the NAND logic gate 220 is kept at a high logic level, which sets the reset terminal of the integrator 288 and clears the integrated voltage ($v_{int}$). When ($v_{int}$) transitions to be less than ($v_r$), the comparator 292 outputs the comparator voltage ($v_{comp}$) as a low logic signal (e.g., transitions from a high logic level to a low logic level). Then comparator voltage ($v_{comp}$) input to the R terminal of the SR latch 210 will not change its output states.

The first gate driver 131 is electrically coupled to the high-side switch 90 and the low-side switch 92 of the current shaping half-bridge 62, and to the SR latch 210. The first gate driver 131 outputs a first control signal $S_b$ to control the operational state of the low-side switch 92 in response to receiving the control signal $S_b'$. Further, the first gate driver 131 outputs a second control signal $S_t$ to control the operational state of the high-side switch 90 in response to receiving the control signal $S_t'$.

The zero-crossing blanking control module 230 is provided to output control signals $SL_b'$ and $SL_t'$ to induce the second gate driver 132 to output third and fourth control signals $SL_b$ and $SL_t$ respectively for controlling the operational state of the low-side switch 102 and the high-side switch 100 respectively of the line synchronization half-bridge 64. The zero-crossing blanking control module 230 generates the control signals $SL_b'$ and $SL_t'$ based on the binary polarity signal (ac_sync) plus small hysteresis in order to avoid signal bouncing when AC voltage changes polarity. Control signals $SL_b$ and $SL_t$ resemble square waveforms with the same frequency of AC voltage (typically 50 Hz or 60 Hz).

Figure 45:
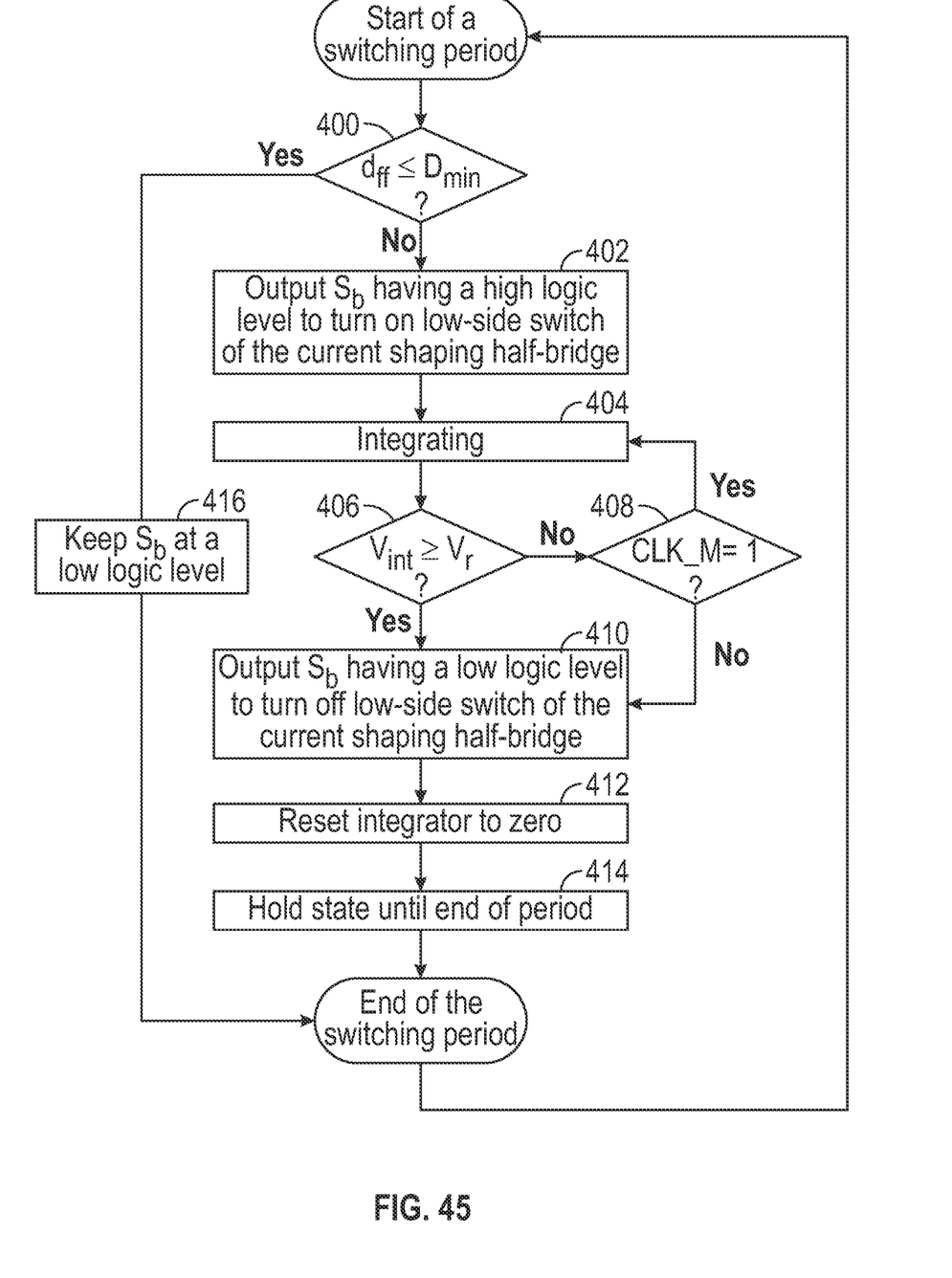
FIG. 45 is a flowchart of a method for controlling a low-side switch of a current shaping half-bridge in the bi-directional totem-pole AC-DC converter.

Referring to FIGS. 1A, 1B and 45, a flowchart of a method for controlling the low-side switch 92 in the current-shaped half-bridge 62 of the bi-directional totem-pole AC-DC converter 26 utilizing the control system 30 will now be explained.

At the start time (e.g., $kT_s$ shown in FIGS. 23-33) of a switching period (e.g., $kT_s$ to $(k+1)T_s$ shown in FIGS. 23-33) of the low-side switch 92, at step 400, the control system 30 makes a determination as to whether the feedforward duty cycle value ($d_{ff}$) is less than or equal to the minimum duty cycle value ($D_{min}$). If the value of step 400 equals "no", the method advances to step 402. Otherwise, the method advances to step 416.

At step 402, the control system 30 outputs the control signal ($S_b$) having a high logic level to turn on the low-side switch 92 of the current shaping half-bridge 62. After step 402, the method advances to step 404.

At step 404, the integrator 288 continues integrating the difference voltage ($v_{in}$) received signal at the input terminal thereof and outputting the integrated voltage ($v_{int}$). After step 404, the method advances to step 406.

At step 406, the comparator 292 makes a determination as to whether the integrated voltage ($v_{int}$) is greater than or equal to the reference voltage ($v_r$). If the value of step 406 equals "no", the method advances to step 408. Otherwise the method advances to step 410.

At step 408, the control system 30 makes a determination as to whether the clock signal CLK_M equals 1. If the value of step 406 equals "yes", the method returns to step 404. Otherwise, the method advances to step 410.

At step 410, the control system 30 outputs the control signal ($S_b$) having a low logic level to turn off the low-side switch 92 of the current shaping half-bridge 62. After step 410, the method advances to step 412.

At step 412, the control system 30 resets the output of the integrator 288 to zero. After step 412, the method advances to step 414.

At step 414, the SR latch 210 holds the state at the Q terminal of the SR latch 210 until the end time of a switching period (e.g., $(k+1)T_s$). After step 414, the method returns to step 400.

Referring again to step 400, if the value of step 400 equals "yes", the method advances to step 416. At step 416, the control system 30 keeps outputting the control signal ($S_b$) having a low logic level to turn off the low-side switch 92 of the current shaping half-bridge 62. After step 416, the method returns to step 400 at the end of a switching period (e.g., $(k+1)T_s$).

Referring to FIGS. 12-22, exemplary signals and values utilized by the control system 30 over a time period T1-T2 are illustrated. In particular, the following exemplary signals are values over the time interval T1-T2 are illustrated: the control signals $SL_b$, $SL_t$, $S_t$, $S_b$, the first clock signal (CLK_m), the second clock signal (CLK_M), the AC voltage ($v_{ac}$), the feedforward duty cycle value ($d_{ff}$), the minimum duty cycle value ($D_{min}$), the compensation voltage ($v_c$), the reference voltage ($v_r$), the integrated voltage ($v_{int}$), the sensed switch current ($i_s$), the current command value ($i_{cmd}$), and the inductor current ($i_L$). As illustrated, the average value of the inductor current ($i_L$) flowing through the inductor 60 is proportional to or tracks (e.g., +−5%) the current command value ($i_{cmd}$). In an exemplary embodiment, the average value of the inductor current ($i_L$) has an amplitude substantially equal (e.g., +−5%) to the current command value ($i_{cmd}$). Further, the bi-directional totem-pole AC-DC converter 26 outputs a power level corresponding to or tracking (e.g., +−5%) the power command value (power_cmd). In an exemplary embodiment, the power level has a value substantially equal (e.g., +−5%) to the power command value (power_cmd).

In summary, in an exemplary embodiment, the average value of the inductor current is maintained within +−5% of the current command value, and the power level is maintained within +−5% of the power command value. In an alternative embodiment, the average value of the inductor current is maintained within +−10% of the current command value, and the power level is maintained within +−10% of the power command value.

Referring to FIGS. 23-33, exemplary signals and values utilized by the control system 30 over a time interval t1-t2 which is subset of the time period T1-T2 are illustrated. In particular, the following exemplary signals are values over the time interval t1-t2 are illustrated: the control signals $SL_b$, $SL_t$, $S_t$, $S_b$, the first clock signal (CLK_m), the second clock signal (CLK_M), the AC voltage ($v_{ac}$), the feedforward duty cycle value ($d_{ff}$), the minimum duty cycle value ($D_{min}$), the compensation voltage ($v_c$), the reference voltage ($v_r$), the integrated voltage ($v_{int}$), the sensed switch current ($i_s$), the current command value ($i_{cmd}$), and the inductor current ($i_L$).

Referring to FIGS. 34-44, exemplary signals and values utilized by the control system 30 over a time interval t3-t4 which is subset of the time period T1-T2 are illustrated. In particular, the following exemplary signals are values over the time interval t1-t2 are illustrated: the control signals $SL_b$, $SL_t$, $S_t$, $S_b$, the first clock signal (CLK_m), the second clock signal (CLK_M), the AC voltage ($v_{ac}$), the feedforward duty cycle value ($d_{ff}$), the minimum duty cycle value ($D_{min}$), the compensation voltage ($v_c$), the reference voltage ($v_r$), the integrated voltage ($v_{int}$), the sensed switch current ($i_s$), the current command value ($i_{cmd}$), and the inductor current ($i_L$). During the period t5-t6, the feedforward duty cycle value ($d_{ff}$) is not more than the minimum duty cycle value ($D_{min}$). Therefore, both the first clock signal (CLK_m) and the second clock signal (CLK_M) stay LOW and there are no switching actions in $S_t$, $S_b$. This will be further explained in a flowchart of method.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for a bi-directional totem-pole AC-DC converter, the converter having a current shaping half-bridge, a line synchronizing half-bridge, and an inductor; the current shaping half-bridge having a high-side switch and a low-side switch being coupled in series between first and second nodes, the line synchronizing half-bridge having a high-side switch and a low-side switch being coupled in series between the first and second nodes, the inductor being coupled to a third node between the high-side switch and the low-side switch of the current shaping half-bridge, comprising:

a first gate driver being electrically coupled to the high-side switch and the low-side switch of the current shaping half-bridge;

a second gate driver being electrically coupled to the high-side switch and the low-side switch of the line synchronizing half-bridge;

a mixed-signal power controller operably coupled to the first and second gate drivers, the mixed-signal power controller having a digital module and an analog module;

the analog module having a current sensor measuring a sensed switch current from the low-side switch of the current shaping half-bridge and generating a current sense voltage based on the sensed switch current;

the digital module having a DC voltage sensor measuring a DC bus voltage across the first and second nodes of the bi-directional totem-pole AC-DC converter and generating a DC sense voltage based on the DC bus voltage;

the digital module having an AC voltage sensor measuring an AC voltage being applied to the bi-directional totem-pole AC-DC converter and generating an AC sense voltage and a binary polarity signal based on the AC voltage, the binary polarity signal indicating a polarity of the AC voltage, the AC sense voltage indicating a magnitude of the AC voltage;

the digital module receiving a power command value and a filtering command value from an external controller;

the digital module determining a feedforward duty cycle value based on the AC sense voltage, the DC sense voltage, and the binary polarity signal;

the digital module generating first and second clock signals based on the feedforward duty cycle value;

the digital module determining a current command value based on the power command value and the filtering command value;

the digital module determining a reference current value associated with the inductor based on the current command value;

the analog module generating a comparator voltage based on a current sensor voltage and a compensation voltage; the compensation voltage being determined based on the reference current value; and the digital module inducing the first gate driver to output first and second control signals for controlling the high-side switch and the low-side switch respectively of the current shaping half-bridge based on the first and second clock signals and the comparator voltage, such that an average value of an inductor current flowing through the inductor is proportional to the current command value, and the bi-directional totem-pole AC-DC converter outputs a power level corresponding to the power command value.

2. The control system of claim 1, wherein:
the digital module inducing the second gate driver to output third and fourth control signals for controlling the high-side switch and the low-side switch respectively of the line synchronizing half-bridge based on the binary polarity signal.

3. The control system of claim 1, wherein:
the digital module determining the current command value based on the AC sense voltage, the binary polarity signal, the power command value, and the filtering command value.

4. The control system of claim 3, wherein:
the digital module determining the reference current value based on the current command value, a current sensing gain value, and a current sensing offset value.

5. The control system of claim 1, wherein:
the analog module further includes an integrator, a comparator, and a subtraction module; the subtraction module operably coupled to the current sensor and the integrator, the subtraction module subtracting the current sense voltage from a compensation voltage to obtain a difference voltage;
the integrator integrating the difference voltage over time and outputting an integrated voltage; and
the comparator comparing the integrated voltage to a reference voltage and outputting the comparator voltage.

6. The control system of claim 1, wherein:
the digital module having a feedforward duty cycle module, a configurator module, and a clock generator;

the feedforward duty cycle module determining the feedforward duty cycle value based on the AC sense voltage, the DC sense voltage, and the binary polarity signal;

the clock generator operably interfacing with the feedforward duty cycle module and the configurator module; the configurator module sending a switching frequency value, a minimum duty cycle value, an inductor value, a DC voltage target value, a current sensing gain, a current sensing offset, and offset value to the clock generator; and the clock generator generating the first and second clock signals based on the feedforward duty cycle value, the switching frequency value, the minimum duty cycle value, the inductor value, the DC voltage target value, the current sensing gain, the current sensing offset, and the offset value.

7. The control system of claim 6, wherein:
the digital module having a first multiplier module, a second multiplier module, a first summing module, a first subtraction module, and a digital-to-analog converter;

the configurator module sending a current compensation value to the first multiplier module, the first multiplier module multiplying the current compensation value and the feedforward duty cycle value to obtain a first current value, and sending the first current value to the first summing module;

the configurator module sending an offset value to the first summing module;

the first summing module summing the first current value and the offset value to obtain a second current value, and sending the second current value to both the first subtraction module and the second multiplier module;

the first subtraction module subtracting the second current value from the reference current value to obtain a third current value;

the second multiplier value multiplying the second current value and the feedforward duty cycle value to obtain a fourth current value;

the digital-to-analog converter receiving the third current value and generating a compensation voltage based on the third current value; and the digital-to-analog converter receiving the fourth current value and generating a reference voltage based on the fourth current value.

8. The control system of claim 7, wherein:
the digital module includes a current command generation module that determines the current command value, and a reference current generation module that determines the reference current value.

9. The control system of claim 1, wherein:
the digital module includes a SR latch having a first input terminal receiving the comparator voltage from the analog module, and a second terminal receiving the first clock signal from a clock generator; and
the SR latch outputting first and second latch signals that are received by the first gate driver to induce the first gate driver to output the first and second control signals respectively.

10. The control system of claim 1, wherein:
the average value of the inductor current is maintained within +−5% of the current command value, and the power level is maintained within +−5% of the power command value.

* * * * *